(12) United States Patent
Flockenhagen et al.

(10) Patent No.: US 10,478,678 B2
(45) Date of Patent: Nov. 19, 2019

(54) CELLULOID-FREE, SUBSTANTIALLY SPHERICAL HOLLOW BODY AND FABRICATION THEREOF

(71) Applicant: WEENER PLASTIK GMBH, Weener (DE)

(72) Inventors: Gerhold Flockenhagen, Weener-Kirchborgum (DE); Matthias Prox, Moormerland (DE); Liam Quaid, County Limerick (IE)

(73) Assignee: WEENER PLASTIK GMBH, Weener (DE)

( * ) Notice: Subject to any disclaimer, the term of this patent is extended or adjusted under 35 U.S.C. 154(b) by 0 days.

(21) Appl. No.: 15/127,852

(22) PCT Filed: May 12, 2014

(86) PCT No.: PCT/EP2014/001277
§ 371 (c)(1),
(2) Date: Sep. 21, 2016

(87) PCT Pub. No.: WO2015/139712
PCT Pub. Date: Sep. 24, 2015

(65) Prior Publication Data
US 2017/0106247 A1    Apr. 20, 2017

(30) Foreign Application Priority Data

Mar. 21, 2014 (DE) .................. 10 2014 004 194

(51) Int. Cl.
*A63B 39/00* (2006.01)
*A63B 39/06* (2006.01)
(Continued)

(52) U.S. Cl.
CPC .............. *A63B 39/00* (2013.01); *A63B 39/06* (2013.01); *A63B 45/00* (2013.01); *B29D 22/04* (2013.01);
(Continued)

(58) Field of Classification Search
CPC ..... A63B 39/00; A63B 45/00; A63B 2102/16; A63B 2209/00
See application file for complete search history.

(56) References Cited

U.S. PATENT DOCUMENTS 3,069,170 A * 12/1962 Dillon, Jr. .......... A63B 37/0003
264/321
3,411,974 A * 11/1968 Jones-Hinton .......... B29C 51/10
156/228
(Continued)

FOREIGN PATENT DOCUMENTS

CN    1057790 A    1/1992
CN    1410250 A    4/2003
(Continued)

OTHER PUBLICATIONS

International Search Report prepared by the European Patent Office dated Sep. 11, 2014, for International Application No. PCT/EP2014/001277.
(Continued)

*Primary Examiner* — Steven B Wong
(74) *Attorney, Agent, or Firm* — Sheridan Ross PC

(57) ABSTRACT

A substantially spherical hollow body, having a diameter of from 37 mm to 45 mm, in particular a diameter of 39.7 mm to 40.75 mm, and a weight of from 2.5 g to 3.5 g, in particular a weight of 2.6 g to 2.85 g, comprising a shell and an inner hollow space, wherein the shell has a wall thickness of 0.2 mm to 1.3 mm, in particular 0.3 mm to 0.8 mm,
(Continued)

characterized in that the shell is free of celluloid and comprises at least one styrene-containing copolymer.

19 Claims, 1 Drawing Sheet

(51) Int. Cl.
    *A63B 45/00*     (2006.01)
    *B29D 22/04*     (2006.01)
    *C08L 25/10*     (2006.01)
    *A63B 102/16*     (2015.01)

(52) U.S. Cl.
    CPC .......... *C08L 25/10* (2013.01); *A63B 2039/003* (2013.01); *A63B 2102/16* (2015.10); *A63B 2209/00* (2013.01)

(56) References Cited

U.S. PATENT DOCUMENTS

| | | | | |
|---|---|---|---|---|
| 3,617,589 A | * | 11/1971 | Jones-Hinton | B29C 51/10 264/153 |
| 4,318,875 A | * | 3/1982 | Shrimpton | A63B 45/00 264/236 |
| 7,008,972 B2 | * | 3/2006 | Sullivan | A63B 37/0003 473/371 |
| 2009/0170634 A1 | * | 7/2009 | Loper | A63B 37/0003 473/373 |
| 2010/0009791 A1 | * | 1/2010 | Yoo | A63B 39/00 473/604 |
| 2010/0081517 A1 | * | 4/2010 | Sullivan | A63B 37/0003 473/373 |
| 2013/0023357 A1 | * | 1/2013 | Bulpett | A63B 37/0003 473/373 |
| 2015/0045161 A1 | * | 2/2015 | Gou | A63B 39/00 473/609 |
| 2016/0074713 A1 | * | 3/2016 | Mochizuki | A63B 39/08 473/609 |

FOREIGN PATENT DOCUMENTS

| | | | | |
|---|---|---|---|---|
| CN | 101272830 | | 9/2008 | |
| CN | 102896788 A | * | 1/2013 | |
| DE | 1478024 A1 | | 8/1970 | |
| EP | 1 924 331 A1 | | 5/2008 | |
| GB | 190215198 A | * | 8/1902 | |
| GB | 1131321 A | * | 10/1968 | A63B 39/00 |
| JP | S50-17897 | | 6/1975 | |
| JP | 5481936 A | * | 6/1979 | |
| JP | S56-34438 | | 4/1981 | |
| JP | 2009-507589 | | 2/2009 | |

OTHER PUBLICATIONS

Official Action with English Translation for Taiwan Patent Application No. 103133112, dated Sep. 19, 2017, 10 pages.
Official Action with English Translation for Taiwan Patent Application No. 103133112, dated May 28, 2018, 3 pages.
Official Action with English Translation for China Patent Application No. 2014800773667, dated Apr. 3, 2018, 17 pages.
Official Action with English Translation for Japan Patent Application No. 2017-500127, dated Feb. 26, 2018, 6 pages.
Official Action for Canada Patent Application No. 2,942,074, dated Mar. 11, 2019, 4 pages.

* cited by examiner

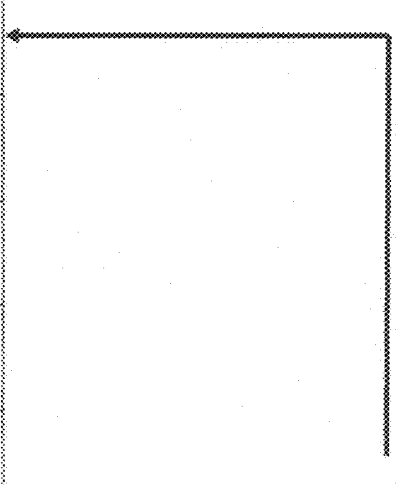

CELLULOID-FREE, SUBSTANTIALLY SPHERICAL HOLLOW BODY AND FABRICATION THEREOF

CROSS REFERENCE TO RELATED APPLICATIONS

This application is a national stage application under 35 U.S.C. 371 and claims the benefit of PCT Application No. PCT/EP2014/001277 having an international filing date of 12 May 2014, which designated the United States, which PCT application claimed the benefit of German Patent Application No. 10 2014 004 194.8 filed 21 Mar. 2014, the disclosure of each of which are incorporated herein by reference.

The present application hereby claims priority from the DE 10 2014 004 194.8 application, which is incorporated by reference herein in its entirety.

The present invention relates to a celluloid-free substantially spherical hollow body, in particular a table tennis ball, the shell of which comprises at least one polymer containing styrene. The invention is described in conjunction with table tennis balls conforming to the regulations of the International Table Tennis Federation (ITTF). It is noted that the invention can also be used for non-ITTF-approved table tennis balls such as, for example, 44 mm diameter balls as used in Asian countries or for recreational/training balls.

Conventional table tennis balls are made from celluloid. Celluloid is a derivative of cellulose and usually produced by nitrocellulose/camphor reaction. Even the standards adopted by the International Table Tennis Federation concerning the mechanical properties of table tennis balls stem from the past decades-long use of such celluloid balls. Celluloid, however, has the disadvantage of being flammable, thereby making both the industrial production as well as the transport and storage of celluloid balls complicated and risky. Due to the risk of explosion, celluloid balls can thus only be transported and stored as hazardous goods. It is therefore desirable to replace celluloid by another material having similar or better mechanical properties. The ITTF thus passed a resolution eschewing the future use of table tennis balls containing celluloid in tournaments.

Celluloid-free table tennis balls are known from the prior art. EP 1 924 331 B1, for example, describes a celluloid-free table tennis ball, the principal component of which is an organic polymer having heteroatoms in its main chain. CN 102896788 A relates to a method for manufacturing a celluloid-free table tennis ball.

The difficulty in providing celluloid-free table tennis balls lies in the fact that specific standards have developed over decades of using celluloid balls which any new table tennis ball material must meet. This relates on the one hand to the mechanical properties of the table tennis balls which, as noted above, are also partly established in the ITTF guidelines, as well as to the "feel" of the table tennis ball during play, which is of great importance with respect to player acceptance.

The invention is thus based on the task of providing celluloid-free table tennis balls which are at least equivalent to table tennis balls made of celluloid.

This is inventively achieved by the teaching of the independent claims. Preferential further developments of the invention form the subject matter of the subclaims.

According to a first aspect, the invention relates to a substantially spherical hollow body, having a diameter of from 37 mm to 45 mm and a weight of from 2.5 g to 3.5 g, comprising a shell and an inner hollow space. The substantially round hollow body according to the invention has in particular a diameter of from 39.25 mm to 40.75 mm and a weight of from 2.6 g to 2.85 g. The shell of the substantially round hollow body has a wall thickness of 0.2 mm to 1.3 mm, particularly 0.3 mm to 0.8 mm. The shell of the substantially round hollow body is free of celluloid and comprises at least one copolymer containing styrene.

As defined by the present invention, the term "celluloid-free" means that the table tennis ball is substantially devoid of celluloid, wherein the presence of minute amounts of celluloid, e.g. as impurities or traces, nevertheless results in a celluloid-free product in the sense of the invention.

Within the context of the present invention, it was found that celluloid-free table tennis balls having at least one styrene-containing copolymer can convey a playing feel comparable to conventional table tennis balls. In particular found was that celluloid-free table tennis balls according to the invention are able to impart a good playing feel comparable to conventional celluloid table tennis balls in both dynamic as well as slower strokes. Moreover, the inventive celluloid-free table tennis balls are able to achieve a comparable sensation in terms of the racket/ball transfer as well as the rotational transfer of reverse spin. Experienced players also perceive the spin of the inventive celluloid-free table tennis balls as comparable to that of conventional table tennis balls. Experienced players in particular have a favorable perception of the inventive celluloid-free table tennis balls' subjective ball hardness and evenness of bounce.

It was furthermore found that the inventive celluloid-free table tennis balls meet the technical criteria specified by the ITTF. In particular, the inventive table tennis balls can achieve the stipulated medium hardness at the pole of 0.68 mm to 0.81 mm as well as the medium hardness at the seam of 0.72 mm to 0.83 mm.

Hardness is determined, as established by the ITTF, using a Zwick tester. The preload for measuring hardness is 0.5 N for 10 seconds. A steel cylinder 20 mm in diameter thereafter applies a force of 50 N to the pole of the table tennis ball at a 10 mm/min loading rate. The table tennis ball is thereby supported at a 45° angle by a funnel-shaped retainer.

The inventive manufacturing method can moreover provide table tennis balls of particularly uniform wall thickness, thereby able to be in compliance with the ITTF-specified standard hardness measurement deviation at the pole and equator for the same ball as well as the hardness measurement between different balls. The method according to the invention provides a more uniform wall thickness than that of table tennis balls known from the prior art. Moreover, the inventive celluloid-free table tennis balls can achieve a bounce within the stipulated range of from 240 mm to 260 mm when dropped onto a standard steel block from a height of 305 mm. The inventive celluloid-free table tennis balls are also able to comply with the stipulated maximum deviation of 175 mm from centerline over a 1$m$ long rolling distance at a rolling speed of approx. 0.3 m/sec ("veer test").

It was furthermore found that the inventive celluloid-free table tennis balls can be equivalent to or better than conventional celluloid table tennis balls in terms of their mechanical properties such as stability, breaking strength and the preventing of stress whitening.

Preferably, the material of which the shell of the table tennis balls is made and which comprises at least one copolymer containing styrene is characterized by the following parameters:

modulus of elasticity as per ISO 527 of from 1500 MPa to 3000 MPa, particularly 1600 MPa to 2500 MPa;

Charpy impact strength as per ISO 179 of from 2 kJ/m$^2$ to 50 kJ/m$^2$ measured at 23° C.;

ball indentation hardness as per ISO 2039-1 of from 50 MPa to 150 MPa;

density as per ISO 1183 of from 0.8 g/cm$^3$ to 1.2 g/cm$^3$, particularly 1 g/cm$^3$ to 1.1 g/cm$^3$.

The desired mechanical properties of the material can be obtained by the styrene-containing copolymer alone or by the combination of the styrene-containing copolymer and at least one second organic polymer, in particular by using a polymer blend of the styrene-containing copolymer and the second organic polymer. Polymer blends allow advantageously combining the properties of the mixture's individual components in a relatively easy way and optimally regulating the given properties profiles. One skilled in the art is thereby able to determine the mechanical properties of the material thus produced with little effort using standardized measuring methods.

As defined by the invention, the term "copolymer" is to be understood as an organic polymer having at least two different monomer units. Copolymers can be subdivided according to the distribution of the monomer units within the polymer chain into: statistical copolymers, in which the distribution of the monomers in the chain is random; gradient copolymers, with in principle random distribution of the monomers but with a variable percentage of at least one monomer in the course of the chain; alternating copolymers, having a regular arrangement of the monomers along the chain; block copolymers, which exhibit longer sequences or blocks for at least one of the monomers; and graft copolymers, in which blocks of a monomer are grafted onto the backbone of another monomer. The term "copolymer" as defined by the invention encompasses all these subcategories. Preferably, however, the styrene-containing copolymer is a statistical copolymer, an alternating copolymer or a block copolymer.

As defined by the invention, the term "styrene-containing copolymer" is therefore to be understood as an organic polymer comprising both styrene monomers as well as other monomers. The styrene-containing copolymer is preferably a thermoplastic.

As defined by the invention, the term "thermoplastic" refers to plastics which are reversibly deformable within a specific temperature range.

As defined by the invention, the term "polymer blend" refers to mixtures of two or more polymers.

The following describes preferential further developments of the invention.

According to one preferential further development, the styrene-containing copolymer comprises olefin monomers, particularly butadiene monomers. This further development provides the advantage of such copolymers being able to exhibit high impact strength. This further development moreover provides the advantage of being able to improve the elasticity of the copolymer.

As defined by the invention, the term "olefin" is to be understood as acyclic and cyclic hydrocarbons having one or more carbon-carbon double bonds. Thereby excluded are hydrocarbons only exhibiting double bonds in aromatic structures.

According to one preferential further development, the styrene-containing copolymer is selected from among the group comprising acrylonitrile-butadiene-styrene copolymer (ABS), styrene-butadiene copolymer (SBC), methyl methacrylate-butadiene-styrene copolymer (MBS) and methyl methacrylate-acrylonitrile-butadiene-styrene (MABS). This further development provides the advantage of higher copolymer impact strength and elasticity. This further development moreover provides the advantage of a large selection of commercially available, well-characterized copolymers of said subcategories having varying mechanical properties. Mixing different styrene-containing polymers can furthermore alter the mechanical properties.

According to one preferential further development, the styrene-containing copolymer has a Charpy impact strength per ISO 179 from 1 kJ/m$^2$ to 30 kJ/m$^2$, in particular from 2 kJ/m$^2$ to 20 kJ/m$^2$, measured at 23° C. This further development provides the advantage of the table tennis ball having a high resistance to sudden impact stress.

According to one preferential further development, the styrene-containing copolymer has a modulus of elasticity per ISO 527 of from 1200 MPa to 3000 MPa, in particular from 1500 MPa to 2500 MPa. This further development provides the advantage of thereby being able to decrease or prevent irreversible material damage upon dynamic stress, particularly stress whitening. This further development moreover provides the advantage of it not being mandatory to add softeners to the styrene-containing copolymer.

According to one preferential further development, the styrene-containing copolymer has a density as per ISO 1183 of from 0.8 g/cm$^3$ to 1.2 g/cm$^3$, in particular 1 g/cm$^3$ to 1.1 g/cm$^3$. These density ranges have proven advantageous in terms of "playability." The density range has in particular proven advantageous for the reason of higher densities resulting in very thin walls along with the corresponding problems in manufacturing and playing.

According to one preferential further development, the shell further comprises at least one second organic polymer. The second organic polymer is preferably a thermoplastic. This further development provides the advantage of thereby being able to optimize the mechanical properties of the table tennis ball. In particular, the respective mechanical properties can be advantageously combined by using polymer blends of at least one styrene-containing copolymer and one second organic polymer.

According to one preferential further development, the second organic polymer is a homopolymer selected from the group comprising polycarbonate and polystyrene. As defined by the invention, the term "homopolymer" is to be understood as an organic polymer exclusively having homogeneous monomers, thus for example solely styrene monomers. This further development provides the advantage of thereby being able to selectively vary the table tennis ball's properties. In particular, by using an appropriate polymer blend of at least one styrene-containing copolymer and one second organic polymer selected from among polycarbonate and polystyrene, the advantageous mechanical properties of the copolymer, particularly the high impact strength and the elasticity, can be combined with the high hardness of the cited homopolymers.

According to one preferential embodiment of this further development, the at least one styrene-containing copolymer is an acrylonitrile-butadiene-styrene copolymer (ABS) and the second organic polymer is a polycarbonate. According to a further preferential embodiment of this further development, the at least one styrene-containing copolymer is a styrene-butadiene copolymer (SBC) and the second organic polymer is a polystyrene. According to a further preferential embodiment of this further development, the at least one styrene-containing copolymer is an acrylonitrile-butadiene-styrene copolymer (ABS) and the second organic polymer is a polyamide.

According to one preferential further development, the second organic polymer is a copolymer selected from the group comprising acrylonitrile-butadiene-styrene copolymer (ABS) and styrene-butadiene copolymer (SBC). This further development provides the advantage of increased flexibility and elasticity. Particularly the bounce and rebound properties of the table tennis ball can thereby be improved.

According to one preferential embodiment of this further development, the at least one styrene-containing copolymer is an acrylonitrile-butadiene-styrene copolymer (ABS) and the second organic polymer is a styrene-butadiene copolymer (SBC).

According to one preferential further development, the second organic polymer has a Charpy impact strength as per ISO 179 of from 1 to 10. According to one preferential further development, the second organic polymer has a Shore hardness pursuant to ISO 868 of 65 to 80D. According to one preferential further development, the second organic polymer has a modulus of elasticity of 1200 to 2000 MPa.

According to one preferential further development, the concentration ratio of the styrene-containing copolymer and the second organic polymer is 1:0.05 to 1:1, particularly 1:0.1 to 1:0.80, particularly preferentially 1:0.25 to 1:0.75. This further development provides the advantage of the respective polymer blend of styrene-containing copolymer and second organic polymer having improved mechanical properties in terms of elasticity, impact strength and hardness. Preferentially, the modulus of elasticity pursuant to ISO 527 for a polymer blend of a styrene-containing copolymer and a second organic polymer at the cited mixing ratio lies in the range of from 1500 MPa to 3000 MPa. Pursuant to ISO 179, the Charpy impact strength of an applicable polymer blend measured at 23° C. is preferably in the range of from 2 kJ/m$^2$ to 50 kJ/m$^2$, and the ball indentation hardness as per ISO 2039-1 is in the range of from 50 MPa to 150 MPa.

According to one preferential embodiment of this further development, the at least one styrene-containing copolymer is an acrylonitrile-butadiene-styrene copolymer (ABS) and the second organic polymer is a polycarbonate and the concentration ratio of ABS to polycarbonate is 0.65-0.75 to 0.25-0.35. The mixture of ABS and polycarbonate at the indicated ratio results in a material having the following advantageous properties:
modulus of elasticity as per ISO 527 of 2000 MPa;
Charpy impact strength as per ISO 179 of 40 kJ/m$^2$ measured at 23° C.;
ball indentation hardness as per ISO 2039-1 of 85 MPa;
density as per ISO 1183 of 1.07 g/cm$^3$.

This material therefore optimally combines the good impact strength of ABS and the high hardness of polycarbonate so that table tennis balls manufactured therefrom have high mechanical strength across a wide temperature range. The properties profile remains virtually constant under the most diverse conditions both during transport as well as during play.

According to one preferential further development, the shell comprises at least one further additive selected from among the group comprising fibers, wafers, spherical particles, inorganic and organic materials, in particular softeners and/or pigments. Fibers, wafers and spherical particles can be both organic as well as inorganic. Suitable softeners, i.e. materials which lend at least some "elastic" properties to the original raw material, are characterized by a modulus of elasticity of less than 500 MPa as well as high elongation at fracture and impact strength and low hardness. These properties are usually obtained by elastomers or low-molecular polymers. This further development provides the advantage of being able to increase the table tennis ball's stability, particularly its resistance to dynamic stress, and improve its visual properties such as color and gloss. This further development moreover provides the advantage of being able to prevent irreversible material damage such as stress whitening.

Preferably, the shell does not contain styrene-containing copolymer mixed with cellulose acetate.

In accordance with a second aspect, the invention relates to a method for producing a substantially round hollow body according to the invention.

The manufacture of an inventive substantially round hollow body preferably ensues by means of injection molding the material for the shell. Injection molding technology, particularly of plastic or materials containing plastic, is known and will therefore not be discussed any further here.

In one particularly preferred manufacturing method for the substantially round hollow bodies, two substantially identical, substantially hemispherical half-shells are injection molded in a first step. Under certain circumstances, such half-shells have slight undercuts and are thus very easily injection molded. The same injection mold or two structurally identical injection molds can furthermore be used for both half-shells, which further reduces manufacturing costs.

In a second step, the two half-shells are then joined together along their edges of largest diameter into a hollow body. The circular seam thus forms a great circle on the substantially round hollow body to be produced.

Joining of the two half-shells then preferably follows while at least one, preferably both, half-shells are situated within a mold after being produced in the injection molding process. Should both half-shells be situated within a mold, this assumes that the two molds can move relative to each other so that the edges of the half-shells they contain can be brought together in joining contact. Leaving at least one half-shell in a mold ensures particularly good alignment of the two half-shells relative each other when joining and largely prevents deformation of the half-shells during the joining process.

In a particularly preferential embodiment of the manufacturing process, the two half-shells can be joined by welding, particularly by ultrasonic welding, vibration welding, hot plate welding, laser welding or spin welding. In a further particularly preferential embodiment, the two half-shells are joined by adhesion.

Upon the joining of the two half-shells, it is possible for a material thickening to form on the inside and/or outside of the substantially round hollow body, particularly a welding bead, an adhesive bead or a beading of some other sort of deformed, e.g. swollen or compressed, shell material. Such a material thickening can impact the physical properties of the hollow body such as its flight or momentum characteristics.

The joining process is therefore preferably designed in such a manner that a material thickening forming on the inside of the hollow body when the two half-shells are joined together exhibits an expansion in each direction of at the most five times, preferably at the most two-and-a-half times, further preferably at the most one-and-a-half times, the mean wall thickness of the hollow body. It is thereby further preferential for a welding bead to exhibit an expansion of at the most five times and an adhesive bead an expansion of at the most two-and-a-half times the hollow body's mean wall thickness.

In a further preferential embodiment, the manufacturing method comprises a further treatment step on the hollow body, particularly by means of stamping, smoothing, irradiating, lapping, buffing, tumbling and/or coating. Tumbling and/or irradiating is thereby preferably realized in the case of at least one inorganic, organic or polymer material and coating in the case of at least one soluble or insoluble material.

Lapping hereby refers to a machining process for smoothing surfaces with free, i.e. loose, particles dispersed in a paste or liquid. In the tumbling process, the parts to be processed are placed into a rotating drum together with polishing or deburring agents and are finished by the parts undergoing contact with one another and with the polishing or deburring agents as the drum rotates.

Preferably, the further treating of the hollow body at least partly removes a material thickness having developed on the exterior of the hollow body upon the two half-shells being joined together. The finishing can however also serve in the surface treatment of the entire hollow body as a whole in order to preferably influence its geometrical properties such as roundness, its visual properties such as color or gloss, its mechanical properties such as coarseness, traction or aerodynamic drag and/or its chemical properties such as its ability to repel dirt or moisture. The surface finishing can furthermore increase the transfer of torque to the hollow body and improve its flight characteristics.

Preferably, the finishing process yields a substantially round hollow body having a circularity tolerance of a maximum 0.2±0.06 mm. The surface quality of the substantially round hollow body's exterior surface is preferably between $R_a=1.0$ and $R_a=5.0$.

The manufacturing method according to the invention preferably produces a substantially round hollow body with a wall thickness having a tolerance of, outside of a possible material thickness at the seam, less than 0.1 mm.

When the roundness and/or wall thickness tolerances fall within the indicated ranges, the flight characteristics, momentum characteristics in terms of height and trajectory, as well as their reproducibility are not or only barely impacted. In particular, a smooth hollow body trajectory with no or with only insignificant shimmy can be achieved.

Preferably, producing the substantially round hollow body by means of the inventive manufacturing method achieves a uniform weight distribution and uniform shell geometry, wherein the gyration radius center of gravity for the three x, y and z axes differs by no more than 0.5 mm, preferably 0.25 mm, and the difference between the maximum and minimum outer diameter of the hollow body in different spatial directions does not exceed 0.5 mm, preferably 0.3 mm.

In order to achieve a uniform weight distribution, the inventive manufacturing method also allows for selectively varying the inner and/or outer geometry of the hollow body. For example, the wall thickness can be slightly increased selectively toward the poles of the substantially round hollow body in order to compensate for the higher weight of a material thickness having formed on the inside of the hollow body at the equator seam.

Instead of injection molding, the substantially hemispherical half-shells can also be produced in a further preferential centrifugal casting manufacturing method. In this process, a hemispherical mold is rotated, preferably about the hollow body's symmetrical axis, and the liquid plastic material is injected into the rotating mold. The plastic material is likewise set into rotation by the friction at the inner wall of the mold and pressed outward against the inner wall of the mold by the centrifugal force. A thin-walled half-shell thus forms in the mold, same solidifying after cooling.

Alternatively to manufacturing via injection molding or centrifugal casting, the two half-shells can also be produced in a further preferential manufacturing method by forming them from initially flat, preferably circular plastic disks.

In this method of manufacture, a plastic sheet or film is first extruded or calendered by pressing and/or rolling the molten plastic through a flat nozzle under pressure and the resulting sheet or film then cooled and hardened. Particularly circular disks are then detached from the sheet or film, preferably by stamping, cutting or sawing them out.

Preferably, an area of the sheet or film is profiled into the wall thickness, preferably by the sheet or film being pressed by a suitable punching tool. Doing so can thus achieve a uniform or profiled wall thickness for the substantially spherical hollow body in the region of the poles for the above-stated purpose.

The disks are then shaped into a hemispherical form as half-shells, preferably by means of deep drawing or vacuum deformation. To this end, the disks are reheated in order to soften them and then pressed into the hemispherical shape by a punching tool and/or drawn to the inner wall of the mold by vacuum.

The disks shaped into half-shells preferably undergo further processing by being cut at their edge along a circular line corresponding to the edge of the hemisphere to be produced and/or the subsequent equator of the substantially spherical hollow body by a cutting tool, preferably a blade, water jet or laser cutter.

Doing so produces substantially hemispherical half-shells which can be joined together into a substantially spherical hollow body as described above.

In a further preferential manufacturing method for the substantially spherical hollow body, same is not pieced together from two half-shells but is rather produced as a single piece, preferably by injection blow molding.

In the injection blow molding process, a preform, produced for example by injection molding, is heated in a hollow spherical-shaped injection-blow mold and "inflated" by the injection of compressed air. After the plastic has cooled and solidified, the injection-blow mold consisting of two pieces, in the present case preferably two hemispherical half-shells, is opened and the substantially spherical hollow body removed.

Any ridge there might still be on the outside of the hollow body at the annular opening point of the mold is lastly removed preferably by means of one of the above-described methods for eliminating material thickness on the outside of the hollow body.

When producing a substantially spherical hollow body by injection blow molding, it is advantageous for the compressed air injection opening to be designed with the smallest possible diameter so that this opening can be closed during the manufacture of the hollow body with liquid plastic or even closes by itself due to the flow of the surrounding plastic.

In a further preferential manufacturing method for the substantially spherical hollow body, same is not pieced together from two half-shells but is rather produced as a single piece, preferably by extrusion blow molding.

In the extrusion blowing process, a tube, produced for example by extrusion, is heated in a hollow spherical-shaped blow mold and is "inflated" by the injection of compressed air or other gas. After the plastic has cooled and solidified, the extrusion-blow mold consisting of two pieces, in the present case preferably two hemispherical half-shells, is opened and the substantially spherical hollow body removed.

Any ridge there might still be on the outside of the hollow body at the annular opening point of the mold is lastly removed preferably by means of one of the above-described methods for eliminating material thickness on the outside of the hollow body.

When producing a substantially spherical hollow body by extrusion blow molding, it is advantageous for the compressed air injection opening to be designed with the smallest possible diameter so that this opening can be closed during the manufacture of the hollow body with liquid plastic or even closes by itself due to the flow of the surrounding plastic.

In a further preferential manufacturing method, the substantially spherical hollow body can also be produced as one piece by centrifugal casting. The necessary volume of liquid plastic is thereby poured into a hollow spherical mold preferably formed from two half-shells. The mold is then closed and rotated preferably simultaneously and preferably uniformly on all three axes.

Analogous to the above description of the centrifugal casting of half-shells, a substantially spherical hollow body forms on the inner wall of the mold which can be removed from the mold after having solidified and the mold having been opened. Any ridge there might still be on the outside of the hollow body at the annular opening point of the mold can be removed again as described above.

According to a third aspect, the invention relates to the use of a copolymer containing styrene, particularly a styrene-containing copolymer comprising olefin monomers, particularly butadiene monomers, for producing a celluloid-free, sphere-shaped, in particular substantially spherical hollow body having a diameter of from 37 mm to 45 mm and a weight of from 2.5 g to 3.5 g.

In accordance with one preferential further development, the styrene-containing copolymer is selected from among the group comprising acrylonitrile-butadiene-styrene copolymer (ABS), styrene-butadiene copolymer (SBC), methyl methacrylate-butadiene-styrene copolymer (MBS) and methyl methacrylate-acrylonitrile-butadiene-styrene (MABS). This further development provides the advantage of combining higher copolymer impact strength and elasticity. This further development moreover provides the advantage of a large selection of commercially available, well-characterized copolymers of said subcategories having varying mechanical properties.

In accordance with one preferential further development, the styrene-containing copolymer is in the form of a polymer blend which furthermore comprises at least one second organic polymer, particularly wherein the second organic polymer is a homopolymer selected from the group comprising polycarbonate and polystyrene or is a copolymer selected from the group comprising acrylonitrile-butadiene-styrene copolymer (ABS) and styrene-butadiene copolymer (SBC). This further development provides the advantage of thereby being able to optimize the mechanical properties of the table tennis ball. In particular, by using a polymer blend of at least one styrene-containing copolymer and one second organic polymer, the relevant mechanical properties ("hardness" and "elasticity") can be advantageously combined.

According to one preferential embodiment of this further development, the at least one styrene-containing copolymer is an acrylonitrile-butadiene-styrene copolymer (ABS) and the second organic polymer is a polycarbonate. This embodiment provides the advantage of thereby being able to combine the advantageous mechanical properties of the ABS copolymer, particularly the high impact strength and elasticity, with the high hardness of the polycarbonate.

According to one preferential embodiment of this further development, the concentration ratio of ABS to polycarbonate is 0.8-1.5 (ABS) to 0.1-0.5 (polycarbonate), preferably 0.9-1.1 to 0.2-0.3, particularly 1.0-0.25. This results in a polymer blend of particularly advantageous mechanical properties.

Further advantages, features and possible applications of the present invention will follow from the description below in conjunction with FIG. 1.

FIG. 1 shows how two experienced players assessed the feel of a table tennis ball made of 25-35% polycarbonate and 75-65% ABS during play compared to prior art celluloid balls and celluloid-free balls.

EXAMPLES

Example 1: Manufacture and Characterization of Celluloid-Free Table Tennis Balls Table tennis balls having a diameter of approximately 40 mm were produced by injection molding two respective hemispherical half-shells and thereafter joining the two half-shells together by welding. Different styrene-containing copolymers and polymer blends of a styrene-containing copolymer and a second organic polymer were used as the material. The table tennis balls thereby manufactured were compared to prior art celluloid and celluloid-free table tennis balls with respect to different ITTF criteria such as weight, diameter, sphericity, deviation, "veer" from a centerline upon straight-line "rolling" on an even surface, bounce and hardness.

The materials used and their mechanical properties are listed in Table 1.

| Table tennis ball | Principal component Polymer | Density ISO 1183 [g/cm$^3$] | Modulus of elasticity ISO 527 [MPa] | Charpy impact strength ISO 179 at 23° C. [kJ/m$^2$] | Ball indentation hardness ISO 2039-1 [MPa] |
|---|---|---|---|---|---|
| 1 | styrene-butadiene copolymer 1 | 1.02 | 1800 | 2 | |
| 2 | acrylonitrile-butadiene-styrene copolymer | 1.04 | 2300 | 19 | 99 |
| 3 | methyl methacrylate-acrylonitrile-butadiene-styrene copolymer | 1.08 | 2000 | 5 | 70 |
| 4 | methyl methacrylate-butadiene-styrene copolymer | 1.05 | 2100 | 4 | 60 |

-continued

| Table tennis ball | Principal component Polymer | Density ISO 1183 [g/cm³] | Modulus of elasticity ISO 527 [MPa] | Charpy impact strength ISO 179 at 23° C. [kJ/m²] | Ball indentation hardness ISO 2039-1 [MPa] |
|---|---|---|---|---|---|
| 5 | styrene-butadiene copolymer 2 | 1.01 | 1500 | 4 | |
| | Polymer mixtures at specific mixing ratios: | | | | |
| 6 | acrylonitrile-butadiene-styrene copolymer + polycarbonate | 1.07 | 2000 | 40 | 85 |
| 7 | styrene-butadiene copolymer 1 + 30% polystyrene | | | | |
| 8 | styrene-butadiene copolymer 1 + 50% polystyrene | | | | |
| 9 | styrene-butadiene copolymer 2 + 30% polystyrene | | | | |
| 10 | styrene-butadiene copolymer 2 + 50% polystyrene | | | | |

Table 2 summarizes the properties profile of the resulting manufactured table tennis balls compared to prior art table tennis balls.

| | Table tennis ball | Material | Deviation (veer) [mm] | Bounce [mm] min. | Bounce [mm] max. | Hardness [mm] Seam line | Hardness [mm] 45° | Hardness [mm] Pole | Std. |
|---|---|---|---|---|---|---|---|---|---|
| | ITTF specifications | | ≤175 | 240 | 260 | 0.72-0.83 | | 0.68-0.81 | 0.08 |
| Prior art | Manufacturer 1 | celluloid | 175 > veer > 60 | 225 | 250 | | | | |
| | Manufacturer 2 | celluloid | Fail | 230 | 255 | 0.74 | 0.8 | 0.69 | 0.05 |
| | Manufacturer 3 | celluloid | 175 > veer > 60 | 230 | 250 | | | | |
| | Manufacturer 4 | celluloid | 175 < veer > 60 | 235 | 250 | | | | |
| | 1 (see Table 1) | SBC 1 | 175 > veer > 60 | 240 | 250 | 0.96 | 0.95 | 0.93 | 0.03 |
| | 2 | ABS | 175 < veer > 60 | 265 | 265 | 0.7325 | 0.7 | 0.8 | 0.097 |
| | 3 | MABS | 175 > veer > 60 | 240 | 245 | 0.5 | 0.52 | 0.56 | |
| | 4 | MBS | 175 > veer > 60 | 240 | 250 | 0.73 | 0.78 | 0.68 | |
| | 5 | SBC 2 | 175 > veer > 60 | 230 | 240 | 1.01 | 1.35 | 1.25 | |
| | 6 | ABS + PC | Veer < 60 | 240 | 255 | 0.72 | 0.76 | 0.71 | |
| | 7 | SBC 1 + 30% PS | 175 > veer > 60 | 245 | 255 | 0.74 | 0.82 | 0.73 | |
| | 8 | SBC 1 + 50% PS | 175 > veer > 60 | 250 | 255 | 0.68 | 0.76 | 0.68 | |
| | 9 | SBC 2 + 30% PS | 175 > veer > 60 | 230 | 245 | 0.75 | 0.99 | 0.78 | |
| | 10 | SBC 2 + 50% PS | 175 > veer > 60 | 245 | 250 | 0.8 | 0.86 | 0.77 | |

Playing Feel

The playing feel of the table tennis ball from Example 1 (25-35% PC+75-65% ABS) was compared by two impartial experienced table tennis players to that of the Nittaku celluloid ball, one of the best celluloid balls currently on the market.

The results are shown in FIG. 1. The two squares/crosses/circles on each line represent the assessments of the two players.

The zero point of the scale indicates the celluloid ball test results in the different categories. The table tennis ball of 25-35% PC+75-65% ABS conveys a comparable feel during play to that of the celluloid ball. This particularly applies to the playing feel upon dynamic and slow strokes as well as the player's sensation of racket/ball transfer, reverse spin rotation transfer, subjective ball hardness and evenness of bounce. The spin of the celluloid-free ball was rated much worse than that of the celluloid ball. All in all, however, the players indicated that the table tennis ball of 25-35% PC+75-65% ABS can be played unproblematically and that it is substantially comparable to the ITTF-approved balls.

The invention claimed is:

1. A table tennis ball with a diameter of from 37 mm to 45 mm, and a weight of from 2.5 g to 3.5 g, comprising a shell and an internal cavity, said shell having a wall thickness of from 0.2 mm to 1.3 mm, wherein a material of the shell is free of celluloid and comprises at least one first polymer, wherein the first polymer is acrylonitrile-butadiene-styrene copolymer (ABS) and at least a second organic polymer, wherein the second organic polymer is a homopolymer of a polycarbonate, and wherein a concentration ratio of the ABS to the polycarbonate is between 0.65-0.75 to between 0.25-0.35.

2. The table tennis ball of claim 1, wherein the a Charpy notched impact strength according to ISO 179 of the material of the shell is from 2 kJ/m$^2$ to 50 kJ/m2 measured at 23° C.

3. The table tennis ball of claim 1, wherein an elasticity modulus according to ISO 527 of the material of the shell is from 1500 MPa to 3000 MPa.

4. The table tennis ball of claim 1, wherein a density according to ISO 1183 of the material of the shell is from 0.8 g/cm$^3$ to 1.2 g/cm$^3$.

5. The table tennis ball of claim 1, wherein the second organic polymer has a Charpy notched impact strength according to ISO 179 of from 1 kJ/m$^2$ to 10 kJ/m$^2$ and a Shore D hardness according to ISO 868 of from 65 to 80.

6. The table tennis ball of claim 1, wherein the shell comprises at least one further additive selected from the group comprising fibers, platelets, spherical particles, inorganic substances, organic substances plasticizers and color pigments.

7. A process for the manufacture of a table tennis ball of claim 1, comprising the steps of:
producing two substantially identical substantially hemispherical shells by injection molding; and
joining of the two half-shells along their edges to form a hollow body.

8. The manufacturing process of claim 7, wherein the joining of the two half-shells occurs by a process selected from the group consisting of welding, ultrasonic welding, vibration welding, hot plate welding, laser welding or rotation welding, or by gluing.

9. The manufacturing process of claim 7, wherein an expansion of a material thickening formed on the inside of the hollow body during joining of the two half-shells in either direction is at the most five times the average wall thickness of the hollow body.

10. The manufacturing process of claim 7, wherein an further step of post-processing of the hollow body, wherein the post processing is selected from the group consisting of cutting, grinding, blasting, lapping, polishing, tumbling with inorganic, tumbling with an organic substance, tumbling with a polymeric substance, tumbling with a combination of two or more of an inorganic substance, an organic substance and a polymeric substance blasting with inorganic substance, blasting with an organic substance, blasting with a polymeric substance, blasting with a combination of two or more of an inorganic substance, an organic substance and a polymeric substance, coating with at least a soluble substance, coating with an insoluble substance, and coating with a combination of a soluble substance and an insoluble substance.

11. The manufacturing process of claim 10, wherein in the post-processing of the hollow body, a material thickening formed on the outside of the hollow body during joining of the two half-shells is at least partially removed.

12. A table tennis ball produced by a manufacturing process of claim 7,
wherein the table tennis ball comprises at least one of the following properties:
a roundness tolerance of at the most 0.2±0.06 mm,
a surface finish of the outer surface between Ra=1.0 and Ra=5.0,
a difference of a barycentre radii of gyration for the three axes x, y and z of at the most 0.25 mm, or
a difference of the outer diameters in various spatial directions of at the most 0.3 mm.

13. A use of a styrene in a table tennis ball comprising a copolymer comprising a first polymer of acrylonitrile-butadiene-styrene copolymer (ABS) for the manufacture of a celluloid-free substantially spherical hollow body having a diameter of from 37 mm to 45 mm and a weight of from 2.5 g to 3.5 g, wherein the styrene comprising copolymer is in the form of a polymer blend, which further comprises at least a second organic polymer, wherein the second organic polymer is a homopolymer of polycarbonate, wherein a concentration ratio of the ABS to the polycarbonate is between 0.65-0.75 to between 0.25-0.35, and wherein the copolymer has a Charpy notched impact strength according to ISO 179 of from 2 kJ/m$^2$ to 50 kJ/m$^2$ measured at 23° C., an elasticity modulus according to ISO 527 is from 1500 MPa to 3000 MPa, and a density according to ISO 1183 is from 0.8 g/cm$^3$ to 1.2 g/cm$^3$.

14. The table tennis ball of claim 1, wherein the diameter is between 39.7 mm and 40.75 mm, the weight is between 2.6 g and 2.85 g, and the wall thickness of the shell is from 0.3 mm to 0.8 mm.

15. The table tennis ball of claim 1, wherein a Charpy notched impact strength according to ISO 179 of the material of the shell is from 2 kJ/m$^2$ to 20 kJ/m$^2$ measured at 23° C.

16. The table tennis ball of claim 1, wherein a density according to ISO 1183 of the material of the shell is from 1 g/cm$^3$ to 1.1 g/cm$^3$.

17. The table tennis ball of claim 1, wherein an elasticity modulus of at least one styrene copolymer according to ISO 527 is from 1500 MPa to 2500 MPa.

18. The table tennis ball of claim 1, wherein the material of the shells consists of the first polymer and the second polymer.

19. The table tennis ball of claim 1, wherein the material consists of the first polymer, the second polymer, and an additive selected from the group consisting of fibers, platelets, spherical particles, inorganic substances, organic substances plasticizers, color pigments, and combinations thereof.

* * * * *